Sept. 24, 1968  M. A. WEISS ET AL  3,403,055
METHOD OF ADDING ORGANIC SURFACE ACTIVE
AGENT TO FUEL CELL ELECTROLYTE
Filed Dec. 31, 1964  2 Sheets-Sheet 1

MALCOLM A. WEISS
CHARLES H. WORSHAM   INVENTORS
HUGH H. HOROWITZ
MANFRED J. PRAGER

BY W.O.Heilman

PATENT ATTORNEY

United States Patent Office 3,403,055
Patented Sept. 24, 1968

---

3,403,055
METHOD OF ADDING ORGANIC SURFACE ACTIVE AGENT TO FUEL CELL ELECTROLYTE
Malcolm A. Weiss, Union, Charles H. Worsham, Fanwood, and Hugh H. Horowitz and Manfred J. Prager, Elizabeth, N.J., assignors to Esso Research and Engineering Company, a corporation of Delaware
Continuation-in-part of application Ser. No. 204,135, June 21, 1962. This application Dec. 31, 1964, Ser. No. 422,609
8 Claims. (Cl. 136—86)

This application is a continuation-in-part of copending application Ser. No. 204,135, filed June 21, 1962, now U.S. Patent 3,188,241 issued June 8, 1965.

This invention relates to new and useful improvements in electrochemical cells and particularly to those cells designed for direct production of electrical energy from liquid fuels. In particular, this invention relates to the operation of electrochemical cells employing an aqueous electrolyte and a liquid carbonaceous reactant that is immiscible with or has limited solubility in such electrolyte. More particularly, this invention relates to fuel cells employing liquid hydrocarbon fuels floating upon an aqueous electrolyte with the fuel electrode or anode positioned at the fuel-electrolyte interface.

The term "fuel cell" is used herein and in the art to denote a device, system or apparatus wherein chemical energy of a fluid combustible fuel, e.g., hydrogen, carbon monoxide, a hydrocarbon or a substituted hydrocarbon containing hydrogen in its molecular structure, is electrochemically converted to electrical energy at a nonsacrificial or inert electrode. The true fuel cell is adapted for continuous operation and is supplied with both fuel and oxidant from sources outside the cell proper. Such cells include at least two nonsacrificial or inert electrodes, functioning as an anode and cathode respectively, which are separated by an electrolyte which provides ionic conductance therebetween, conduction means for electrical connection between such anode and cathode external to such electrolyte, means for admitting a fluid fuel into dual contact with the anode and electrolyte and means for admitting a fluid oxidant into dual contact with the cathode and electrolyte. Where necessary or desired, the electrolyte compartment is divided into an anolyte compartment and a catholyte compartment by an ion-permeable partition or ion-exchange membrane. Thus, in each such cell, a fluid fuel is passed to the anode and there oxidized electrochemically, giving up electrons to the anode, while a fluid oxidant is passed to the cathode and there reduced upon receiving electrons from such cathode. Since the voltage developed by an individual cell is low, it is usually preferable to employ relatively small cells and to electrically connect large numbers of such cells in series or in both series and parallel.

The invention is also applicable to electrolytic cells which unlike the aforementioned fuel cells do not provide a net production of electrical energy but in which an organic fuel is oxidized electrochemically at the anode thereof. In such cells a direct current of electrical energy from an external source, e.g., a fuel cell, a storage battery or an alternating current rectifier, is admitted to the electrical circuit to provide an electron supply to the cathode. These cells evolve hydrogen from an aqueous electrolyte and water is added to the electrolyte while the cell is in operation. Such cells can be used for electrochemical production of various organic chemicals, e.g., conversion of alcohols to ketones, hydrocarbons to carboxylic acids, etc.

Cells of the type hereinbefore described have been successfully operated with both gaseous and liquid fuels. Where the fuel is employed as a gas, a porous electrode has proven an effective means for establishing the essential three-way contact of fuel, electrolyte and electrode. Gaseous fuels provide certain problems such as pressurized storage, etc. and, of course, many suitable fuels are liquids at the operating temperatures employed with aqueous electrolytes.

The problems encountered with liquid fuels which are readily soluble in the electrolyte are quite different from those encountered with immiscible fuels.

With liquid fuels which are either essentially immiscible with the electrolyte or only slightly soluble in such electrolyte the establishment of the essential three-way contact over a suitable reaction area per unit volume of cell has proven especially difficult. The feeding of such fuels through a porous electrode had been suggested but has not proven as effective as with gaseous fuels. It has also been suggested to emulsify such fuels with the electrolyte with a view to achieving conditions similar to those occurring with soluble fuels. The complexities of the emulsion art together with problems of diffusion and viscosity control have held back development of a practical application of this technique.

It now has been discovered that fuels immiscible with the electrolyte or only slightly soluble therein can be efficiently oxidized by maintaining an interface between the immiscible fuel and the aqueous electrolyte. Said interface may be effected by floating the fuel upon the electrolyte such as set forth in FIGURES 1 and 2 or by maintaining a substantially vertical interface within an electrode such as set forth in FIGURE 3. When the fuel and electrolyte are positioned such that the interface between the two is essentially horizontal, the fuel electrode or anode can either extend vertically through the interface as depicted in FIGURES 1 and 2 or the electrode may be placed in a horizontal position such that the interface between the immiscible fuel and aqueous electrolyte will be within the electrode in much the same manner as the vertical electrode in FIGURE 3. In the preferred embodiment of this invention, a surface-active agent is added to the electrolyte in order to effect a large increase in cell efficiency.

The fuels to which this invention is directed include aliphatic saturated and unsaturated hydrocarbons such as hexane, hexene, heptane, heptene, octane and octene, as well as hydrocarbon mixtures such as kerosene, gasoline, diesel fuel, etc.

The function of the surfactant in this process is to increase the electrode area available to the fuel for electrochemical oxidation without decreasing the overall efficiency of the half cell.

It is surprising that surface-active agents should increase the area over which reaction occurs near a liquid-liquid-solid phase boundary or interface. Surprisingly, the tests made show that the reaction area extends into the electrolyte at the electrolyte-immiscible fuel interface, and separate experiments show that the metal is preferentially wet by the nonaqueous layer. Thus, the electrochemical reaction appears to be occurring on an electrode area covered by a nonconducting medium. So far as it is known, this phenomenon has not been recognized by the art. Secondly, the depth of the meniscus, $d$, is obtained by the formula $$d^2 = \frac{2\sigma}{\rho g}(1 - \sin \alpha)$$

where $\sigma$ is the interfacial tension between the liquids, $\rho$ is the difference between the density of the electrolyte and the fuel, $g$ is the gravity constant and $\alpha$ is the contact angle between the nonaqueous layer and the solid surfaces.

In systems observed, $\alpha$ always has been close to zero so that $$d^2 = \frac{2\sigma}{\rho g}$$

Surfactants ordinarily lower the surface tensions of aqueous solutions, i.e., decrease $\sigma$. Therefore, they should be expected to decrease the area in which reaction occurs rather than increase it.

Furthermore, insertion of the most favorable reasonable values of $\sigma$ and $\rho$ into the equation last-above stated gives a value for $d$ of less than 4 mm. for the useful immersion depth and values for $d$ of less than 2 mm. might reasonably be expected with the employment of a surfactant. To the contrary, however, it has been observed that the useful depths achieved by aid of the surfactant are considerably larger than where the same is not employed. This indicates that the reaction is occurring considerably beyond the calculable meniscus and that the surfactant is enhancing the reaction in this region by some mechanism the exact nature of which is not known.

The fuel electrode employed in accordance with this invention may be either of the porous variety or impervious plates, both of which are well-known in the art. However, since the area of effective reaction extends only a limited distance on either side of the interface, this fact should be considered in the design of a cell for employing a floating fuel.

Suitable electrode designs for use with the process of this invention include any of the conventional, porous, nonporous, metallic or carbon and metal structures known to the art for use with aqueous electrolytes.

Electrolytes suitable for use with this invention include both acids and bases among which $H_2SO_4$, $H_3PO_4$, NaOH, and KOH are typical examples. Acids are preferred for fuel cell operations in that they permit rejection of carbon dioxide produced in the electrochemical oxidation of organic fuels.

In accordance with this invention the surface-active agent employed in the electrolyte solution can be either nonionic, anionic, cationic or, if desired, mixtures of the same. Of these the nonionic surfactants are preferred.

The aforementioned general types of surfactants can be further subdivided into groups in accordance with their general chemical characteristics. The more common representatives of the groups are included in the following list:

Anion-active surface-active agents

Alkyl aryl sulfonates and phosphonates
Alkyl sulfates and phosphates
Sulfated and sulfonated amides and amines
Sulfated and sulfonated esters and ethers
Alkyl sulfonates and phosphonates Cation-active surface-active agents Salts of simple primary or tertiary amines
Quaternary ammonium salts
Salts and quaternary derivatives of amino amides
Quaternary amine sulfates
Salts and quaternary derivatives of imidazolines
Salts and quaternary derivatives of amino esters Nonionic condensates Fatty acid esters
Ester-ethers
Fatty alcohol ethers
Alkyl aryl polyglycol ethers
Ethoxylated fatty amides The foregoing lists are illustrative but not exhaustive. Among these are the fluorocarbon surfactants which may take the form of one of the aforenamed surfactant groups, with fluorine substitution for hydrogen atoms in the lipophilic portion of the molecule.

Representative nonionic surfactants for use in this invention include those represented by the following type formulas:

$$RO(CH_2CH_2O)_nH$$
$$RR'O(CH_2CH_2O)_nH$$
$$RR'CH_2O(CH_2CH_2O)_nH$$
$$RO(CH(CH_3)CH_2O)_n(CH_2CH_2O)_mH$$

wherein R represents an alkyl radical, R' a phenylene radical and $n$ and $m$ are positive numbers, the value of $n$ and $m$ and the number of carbon atoms in R providing a balance in conformance with the general requirements for the surfactant hereinafter set forth.

When nonionic surfactants are employed it is preferred to employ a compound having an HLB value in the range of about 4 to 8. Solubility characteristics of a surfactant are dependent upon the existing balance between the lipophilic portion of the molecule, e.g., hydrocarbon radical, and the hydrophilic portion, e.g., ethylene oxide groups. A measure of this balance recognized in the art is the HLB value. The specific system of calculating HLB value employed herein is set forth in "Interfacial Phenomena," J. T. Davies and E. K. Rideal, Academic Press, 111 5th Avenue, New York 3, N.Y. (1961) at p. 372 which is to be considered incorporated herein by reference together with the references cited thereon.

Cationic surfactants which may be used include those having an HLB value in the range of about 0.6 to about 16.3. These are illustrated by the following compounds:

$$(CH_3)_3NO$$
$$C_{12}H_{25}(CH_3)_2NO$$
$$(C_{12}H_{25})_2CH_3NO$$
$$(C_{12}H_{25})_3NO$$

Anionic surfactants which may be used include those having an HLB value in the range of about 9.4 to 44.5. These are illustrated by the following compounds:

$$C_{13}H_{27}(-OCH_2CH_2)_nSO_4^-M^+$$
$$C_{30}H_{61}SO_4^-M^+$$

and $$RR'SO_3^-H^+$$

where $n$ is zero or a positive number in the range of about 1 to 15, M is hydrogen ion or other cation, e.g., Na, K, etc., R is an alkyl radical containing about 2 to 12 carbon atoms and R' is a phenylene radical.

In general, any surfactant can be used which does not adversely affect the intended half cell reaction while extending the effective reaction area.

The concentration of the surfactant in the electrolyte solution can vary over a wide range. If the chemical composition of the surfactant is such that it competes with the regular organic fuel for electrochemical oxidation at the anode, it is preferred to operate with low concentrations of surfactants which are either periodically or continuously replaced. The concentration of surfactant in the electrolyte solution will ordinarily be above about 0.001 wt. percent, preferably in the range of about 0.001 to 1.0, and most preferably about 0.1 to 0.3 wt. percent.

In a preferred embodiment of the invention, the nonionic surfactant is a compound in accordance with the aforelisted type formula $$RO(CH_2CH_2O)_nH$$

wherein the hydrophobic or lipophilic portion of the molecule is an aliphatic alcohol having about 8 to 30, preferably about 12 to 18, carbon atoms per molecule. The amount of ethylene oxide employed will vary somewhat in accordance with the number of carbon atoms in the hydrophobic portion of the molecule. Employing tridecyl alcohol as an illustrative example of the hydrophobic groups, the best results are obtained when this is combined with about 10 to 20, preferably about 12 to 16, ethylene oxide units per molecule.

Referring now to the accompanying drawings which illustrate two general types of cells in which the instant invention provides advantages, it is to be understood that each figure illustrates only one of many embodiments of each type of cell.

Figure 1:
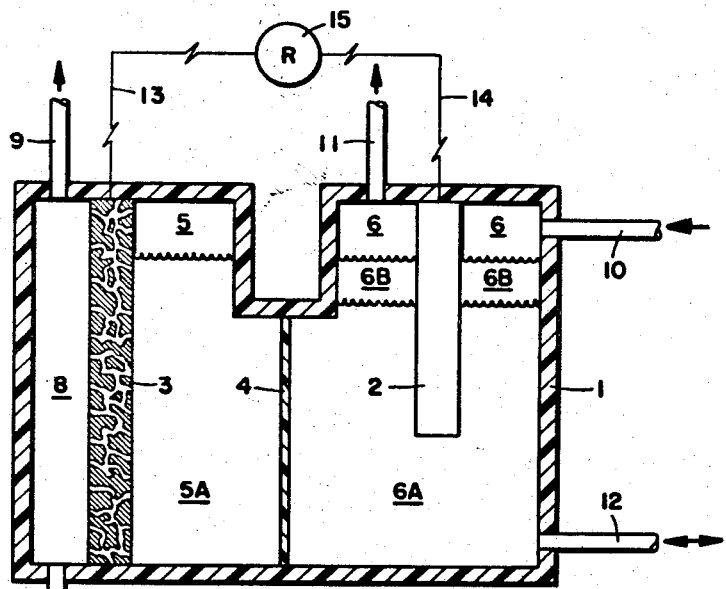
FIGURE 1 is a schematic side view of a fuel cell which utilizes a fuel immiscible with the electrolyte.

Referring now to FIGURE 1, there is shown a cell container 1 of suitable material, e.g., glass, hard rubber, corrosion resistant metal, etc., having positioned therein an anode 2 and a cathode 3, and an ion-permeable or ion-exchange cell divider 4 which partitions the compartment formed by container 1 into an oxidant receiving zone 8, a catholyte zone 5 and an anolyte zone 6. Cathode 3 is here shown as a porous carbon plate which may be impregnated with a suitable metal catalyst. Oxidant inlet conduit 7 provides means for passing a fluid oxidant into oxygen receiving zone 8 and hence into contact with cathode 3 so as to contact the catholyte on or within cathode 3. Oxidant outlet conduit 9 provides exhaust means for the escape of excess oxidant or other gases from oxygen receiving zone 8. Since the cathodic half-cell is not directly involved with the essential novelty of this invention it becomes obvious that any suitable cathode or oxidant adapted for use with an aqueous electrolyte can be used. Thus, in lieu of the direct reduction of gaseous oxygen at the cathode a liquid oxidant such as nitric acid can be used and the reduction product thereof regenerated with gaseous oxygen or air.

In the anodic half-cell anode 2 is here shown as a metal sheet which may be coated with a suitable catalyst comprising one or more metals which have been deposited thereon either chemically or electrochemically. The composition and structure of anode 2 may also be varied so as to employ any of the suitable electrode types known to the art so long as the same is compatible with the electrolyte system employed.

Catholyte compartment 5 and anolyte compartment 6 each contain an aqueous electrolyte, e.g., 30 wt. percent $H_2SO_4$, 5A and 6A, respectively. On top of the anolyte 6A there is floated a layer of fuel 6B which is essentially immiscible with the electrolyte, e.g., heptane. Anolyte 6A also contains a small amount of a surface-active agent as hereinbefore described. Fuel inlet conduit 10 provides means for admitting fuel 6B to anolyte 6A. Anode 2 is positioned so as to extend through the interface formed by 6A and 6B. Anolyte exhaust conduit 11 provides escape means for gases, e.g., $CO_2$, formed in anolyte zone 6. Anolyte inlet conduit 12 provides means for admitting surfactant or fresh electrolyte to anolyte zone 6 and can also be used for draining such compartment, removing an electrolyte-product mixture, etc.

Anode 2 and cathode 3 are electrically connected by wires 13 and 14 and resistance means 15 which is symbolic of any device or apparatus adapted to use direct electric current for activation, e.g., a light bulb. The cell is, of course, operative without means 15.

Figure 2:
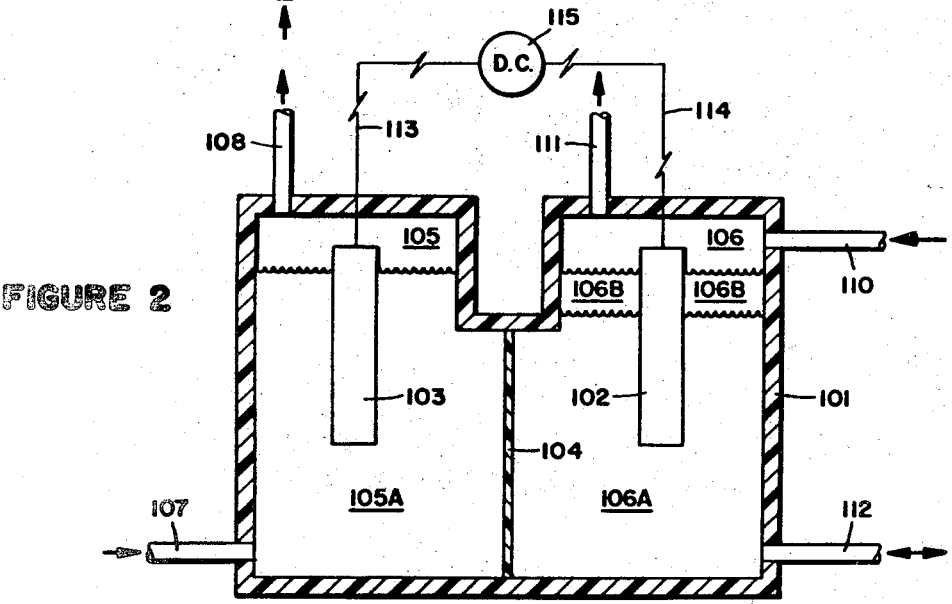
FIGURE 2 is a schematic side view of a power driven chemical production cell which utilizes fuel immiscible with the electrolyte.

Referring now to FIGURE 2 there is shown an externally powered cell for use in chemical production which is encompassed by a cell container 101. Inside container 101 are positioned two sheet-like electrodes, anode 102 and cathode 103. The compartment formed by container 101 is partitioned by divider 104 into a catholyte zone 105 and an anolyte zone 106. A source of direct electric current, e.g., a storage battery, a fuel cell pack, or an alternating current rectifier is electrically connected to anode 102 via wire 114 and to cathode 103 via wire 113. Inside catholyte compartment 105 and anolyte compartment 106 is an aqueous electrolyte, e.g., $H_2SO_4$, KOH, etc., 105A and 106A, respectively. Floating on anolyte 106A is a liquid organic material, e.g., octene which is essentially immiscible with the aqueous electrolyte. Anode 102 extends through the interface formed by 106A and 106B. When power is admitted to the circuit via power source 115 the organic reactant 106B is electrochemically oxidized at anode 102. Such oxidation is controlled by means known to the art so as to remove partial oxidation products of 106B rather than allowing the same to be converted to carbon dioxide which is the desired product in the fuel cell operation previously described. At the same time hydrogen gas is formed at cathode 103 from the aqueous catholyte 105A and escapes from the cell via catholyte exhaust conduit 108. Catholyte inlet conduit 107 provides means for supplying make-up water to the catholyte. Returning now to the anolyte zone, reactant inlet conduit 110 provides means for admitting the liquid reactant 106B to the anolyte 106A. Anolyte exhaust conduit 111 provides means for the escape of any gaseous materials formed by the electrochemical oxidation of 106B and the lower anolyte conduit 112 may be used to replenish electrolyte 106A or to remove an electrolyte-partial oxidation product for separation and recovery.

Figure 3:
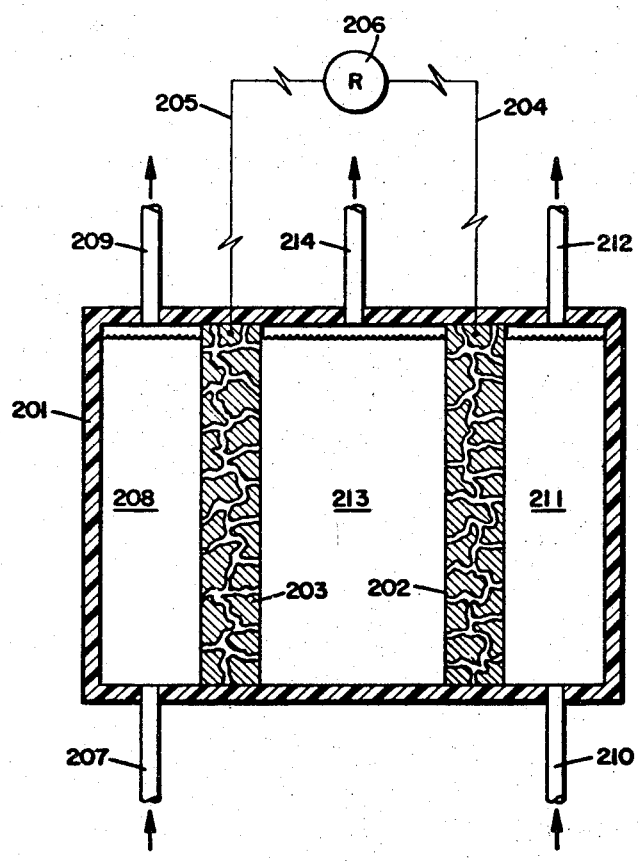
FIGURE 3 is a schematic side view of a cell wherein the interface between the immiscible fuel and electrolyte is vertical.

Referring now to FIGURE 3, there is shown a fuel cell for use in anodically oxidizing a fuel immiscible with electrolyte which is encompassed by a cell container 201. Inside container 201 are positioned two sheet-like electrodes, anode 202 and cathode 203. The compartment formed by container 201 is partitioned by electrodes 202 and 203 into a fuel zone 211 and electrolyte zone 208. Anode 202 and cathode 203 are shown as porous plates such as carbon plates or porous bodies comprising a mixture of a polymer and finely divided carbon. Each of the electrodes may be coated or impregnated with suitable catalytic materials. Anode 202 is electrically connected to cathode 203 through an external circuit comprising electrical conduit 204 connecting the anode to an external electrically driven device 206 which is connected through electrical conduit 205 to the cathode. Fuel is admitted to the cell through conduit 210 into a compartment 211. The products of the anodic oxidation exit through conduit 212. Oxidant is admitted into the cell through conduit 207. Products and excess oxidant exit through conduit 209. Oxidant compartment 208 is shown having a liquid oxidant such as nitric acid therein. However, a gaseous oxidant such as air or oxygen may, of course, be utilized. The cell is fitted with a conduit 214 which can be used to admit electrolyte to the cell and equalize pressure within the cell by allowing excess electrolyte and reaction products to be removed from the cell. The immiscible fuel in compartment 211 forms an interface with the electrolyte of compartment 213 at either surface of anode 202 or within the pores of anode 202. In practice, the interface is generally within the electrode body. The electrolyte compartment 213 may be filled with any suitable aqueous electrolyte known to the art. The fuels to be used in the practice of this invention are any of the fuels hereinbefore described.

The cell dividers 4 and 104 in FIGURES 1, 2 and 3 are cell components known to the art and may consist of an ion-exchange membrane, a glass frit or other suitable ion-permeable materials.

The components of the electrodes in all the modifications described above are well-known and need not be described in detail. Suitable catalysts, electrolytes, oxidants and fuels for cells employing liquid fuels have been described often in the literature and need not be further detailed herein since this invention is concerned with a method of fueling or supplying reactant to electrolytes and to the use of surfactants in such electrolytes.

The invention will be more fully understood from the following examples which are for purposes of illustration only and should not be construed as limitations upon the true scope of the invention as set forth in the claims.

EXAMPLE 1

The effect of the addition of surfactants to the electrochemical oxidation of a liquid fuel floating upon an aqueous electrolyte was tested by changing the position of the anode, fuel electrode, and measuring the current generated at different positions. Control runs were made without a surfactant.

A layer of a hydrocarbon fuel, i.e., 2-heptene, was floated upon an aqueous sulfuric acid electrolyte containing 3 moles $H_2SO_4$ per liter except in the one test indicated. Electrolyte temperature was maintained at about 180° F. An anode formed of a sheet of platinum foil 1.8 cm. wide and coated with platinum black was passed through the hydrocarbon phase, the interface between the hydrocarbon phase and the aqueous phase, and into the aqueous phase. The cell was operated at varying depths of immersion into the aqueous phase to determine the useful area on the surface of the anode, i.e., that area above and below the interface at which significant electrochemical oxidation takes place. After this was determined and the maximum current obtainable with this equipment and conditions determined, i.e., the aforementioned control runs, a number of surface-active agents were added to the aqueous phase and the same measurements and tests repeated. The concentration of surfactant in the electrolyte was 0.1% for each test. The results of the aforedescribed tests showing the effective distance of immersion are set forth in the following table.

TABLE I.—EFFECT OF NONIONIC SURFACTANT ON FUEL CELL REACTION WITH 2-HEPTENE FLOATED ON $H_2SO_4$ ELECTROLYTE WITH ANODE EXTENDING THROUGH FUEL-ELECTROYLTE INTERFACE

| Surfactant | Useful Anode Immersion in Acid Layer in mm. | Current Derived at 0.86 Volts Polarization vs. Standard $H_2$ Reference | |
|---|---|---|---|
| | | Amps./Ft.$^2$ | Amps.×10$^3$ |
| None | 2 | 1.4 | 1.2 |
| A $^1$ | 8 | 0.4 | 1.4 |
| B $^2$ | 8 | 0.9 | 3.2 |
| C $^3$ | 8 | 2.6 | 8.5 |
| D $^{4\,3}$ | 6 | 3.2 | 8.5 |

$^1$ Ethylene oxide condensate with or adduct of tridecyl alcohol containing 9 moles ethylene oxide per mole of tridecyl alcohol.
$^2$ Ethylene oxide condensate with or adduct of tridecyl alcohol having a 30/1 mole ratio of oxide to alcohol.
$^3$ Ethylene oxide condensate with or adduct of tridecyl alcohol having a 15/1 mole ratio of oxide to alcohol.
$^4$ Electrolyte contained 0.5 mole $H_2SO_4$/liter.

EXAMPLE 2

A cell was operated as in Example 1 with the following differences. The anode employed was a platinum black coated glass frit having an average diameter of 1.8 cm. No surfactant was added to the electrolyte. A maximum current of 25 milliamperes was obtained at 3 mm. immersion. The current density at this level of immersion based on useful electrode surface was 10 milliamperes/cm.$^2$.

A further test was made using 0.1 wt. percent of a surfactant, 15 mole ethylene oxide adduct of tridecyl alcohol, in the electrolyte. At 1.2 cm. anode immersion a current of 75 milliamperes was obtained.

EXAMPLE 3

An electrochemical oxidation of 2-heptene was carried out using a 0.5 molar $H_2SO_4$ electrolyte at 180° F. and an anode comprising a platinum black coated glass frit having an average diameter of 1.8 cm. The frit was positioned so as to extend through the heptene-electrolyte interface and various surfactants were tested for effect upon the reaction. The amount of surfactant employed was in all cases 0.1 wt. percent based on total electrolyte solution. The results of these tests are set forth in the following table:

TABLE II.—EFFECT OF VARIOUS SURFACTANTS ON OXIDATION OF 2-HEPTENE FLOATED ON $H_2SO_4$ ELECTROLYTE WITH PT. COATED GLASS FRIT ANODE EXTENDING THROUGH INTERFACE

| Surfactant | Surfactant Type | HLB Value | Milliamperes at Indicated Voltage from St. $H_2$ Ref. | | | | |
|---|---|---|---|---|---|---|---|
| | | | 0.5 | 0.6 | 0.7 | 0.8 | 0.9 |
| E $^1$ | Anionic | 36.7 | 8.1 | 16.5 | 27 | 43 | 61 |
| F $^2$ | Cationic | 11 | 4.8 | 10.5 | 24 | 36 | 51 |
| G $^3$ | Nonionic | 5.7 | 9.9 | 23.5 | 50.7 | 60 | |
| H $^4$ | do | 6.7 | 13.0 | 27.5 | 52 | 66 | |
| I $^5$ | do | 7.2 | 12.4 | 25.5 | 45.5 | 76 | 100 |
| J $^6$ | do | 7.7 | 9.7 | 17.5 | 41.5 | 72 | 79 |
| K $^7$ | do | 12.6 | 9.1 | 19 | 40.5 | 58 | 60 |
| L $^8$ | do | 4.3 | 8.2 | 17 | 31 | 45 | 51 |
| M $^9$ | do | 4.9 | 8.5 | 20 | 33 | 45 | 62 |
| N $^{10}$ | do | 5.4 | 7.5 | 18 | 34 | 52.5 | 59.5 |
| O $^{11}$ | do | 5.9 | 5.9 | 17.5 | 42.5 | 62 | 71 |
| P $^{12}$ | do | 11.7 | 10.9 | 21.5 | 40 | 46 | 46 |
| None | | | 7.7 | 9.2 | 17 | 30 | 37 |

$^1$ 5 mole ethylene oxide adduct of tridecyl alcohol sulfate.
$^2$ Lauryl dimethylamine oxide.
$^3$ 9 mole ethylene oxide adduct of tridecyl alcohol.
$^4$ 12 mole ethylene oxide adduct of tridecyl alcohol.
$^5$ 13.5 mole ethylene oxide adduct of tridecyl alcohol.
$^6$ 15 mole ethylene oxide adduct of tridecyl alcohol.
$^7$ 30 mole ethylene oxide adduct of tridecyl alcohol.
$^8$ 7.5 mole ethylene oxide adduct of nonyl phenol.
$^9$ 9.5 mole ethylene oxide adduct of nonyl phenol.
$^{10}$ 11.0 mole ethylene oxide adduct of nonyl phenol.
$^{11}$ 12.5 mole ethylene oxide adduct of nonyl phenol.
$^{12}$ 30 mole ethylene oxide adduct of nonyl phenol.

EXAMPLE 4

A further test was made using a saturated hydrocarbon fuel, n-decane, floating upon a 0.5 molar $H_2SO_4$ electrolyte. The temperature was 180° F. and the anode, fuel electrode, was a glass frit upon which platinum black had been electrodeposited. The results obtained with and without a surfactant are given in the following table:

TABLE III.—EFFECT OF SURFACTANTS IN ELECTROCHEMICAL OXIDATION OF N-DECANE FLOATED ON $H_2SO_4$ ELECTROLYTE WITH PT COATED GLASS FRIT ANODE EXTENDING THROUGH INTERFACE

| Surfactant | Current in Amps.×10$^3$ at Indicated Voltage From St. $H_2$ Ref. | | |
|---|---|---|---|
| | 0.5 | 0.6 | 0.7 |
| None | 0.7 | 2.5 | 4.4 |
| Q $^1$ | 6.6 | 7.5 | 25.5 |

$^1$ 50/50 mixture of 12 and 15 mole ethylene oxide adducts of tridecyl alcohol.

EXAMPLE 5

Further tests are conducted as in Example 3 with the same surfactants except that a concentration of 0.001 wt. percent surfactant is employed in one series of tests, 0.01 wt. percent is employed in a second series of tests, 0.3 wt. percent in a third series of tests, 0.5 wt. percent in a fourth series of tests and 1.0 wt. percent in a fifth series of tests. An increase in total current density above that obtained with the same fuel without a surfactant in the electrolyte is obtained in each test.

EXAMPLE 6

A further test was made utilizing decane as the fuel, 30 wt. percent sulfuric acid as the electrolyte and a sintered platinum-polytetrafluoroethylene electrode as a driven anodic half cell. The half cell was run at a maximum current density of about 12 ma./cm.$^2$ at a steadily increasing polarization. When the polarization reached 0.71 volt, a finely divided surfactant comprising a mixture of salts of a perfluoro normal alkyl sulfonic acid having eight carbon atoms in the alkyl chain was added to the electrolyte of the cell. The polarization dropped immediately and leveled off at about 0.47 volt. The current was then increased to 20 ma./cm.$^2$ and the polarization increased to a maximum of only 0.55 volt. The surfactant is marketed as FC-95 by the Minnesota Mining and Manufacturing Company.

EXAMPLE 7

A half cell in accordance with that in Example 6 was operated in order to test the surfactant comprising the salts of a perfluoro normal $C_8$ alkyl sulfonic acid. Before the surfactant was added, only 6 ma./cm.$^2$ could be drawn at a polarization of 0.74 volt. However, when 0.02 wt. percent of the surfactant was added, the polarization dropped to 0.32 volt. Further tests showed that the cell could sustain a current of 35 ma./cm.$^2$ at a polarization of only 0.67 volt.

EXAMPLE 8

A further test was made utilizing decane as the fuel, 30 wt. percent sulfuric acid as the electrolyte and sintered platinum-polytetrafluoroethylene as the electrodes as both the anode and cathode. The cell was assembled substantially as set forth in FIGURE 3. The cell was operated at a current density of about 12 ma./cm.$^2$ at an increasing polarization. When the polarization reached about 0.7 volt, 0.02 wt. percent of a finely divided surfactant, a salt of perfluoro octyl sulfonic acid, was added to the electrolyte of the cell. The polarization dropped to about 0.33 volt and thereafter increased to a maximum of only about 0.56 volt after sustained operation.

The term "surfactant," the properties and the effects of surface-active agents are discussed in detail in "Textile Chemicals and Auxiliaries With Special Reference to Surfactants," second edition (1957), Reinhold Publishing Corp., New York, N.Y. See particularly pp. 302–319.

The surfactant ordinarily will be added directly to the electrolyte but may be added to the system with the fuel. The requirement of being in the electrolyte is satisfied by the surfactant reaching the fuel-electrolyte interface.

What is claimed is:

1. In a process of anodically oxidizing an immiscible liquid carbonaceous fuel at the anode of a fuel cell while in contact with an aqueous electrolyte, said fuel being immiscible with said electrolyte, the improvement which comprises positioning said anode so as to extend through the resulting fuel-electrolyte interface and introducing about 0.001 wt. percent to 1.0 wt. percent of an organic surface-active agent comprising in combination a lipophilic component and a hydrophilic component into said electrolyte, said organic surface-active agent being selected from the group consisting of anionic and cationic surface-active agents.

2. A process in accordance with claim 1 wherein said surface-active agent is a cationic surfactant having an HLB value in the range of about 0.6 to about 16.3.

3. A process in accordance with claim 1 wherein said surface-active agent is an anionic surfactant having an HLB value in the range of about 9.4 to 44.5.

4. A process in accordance with claim 2 wherein the cationic surfactant is a compound selected from the group having the formula, $$(CH_3)_3NO$$
$$C_{12}H_{25}(CH_3)_2NO$$
$$(C_{12}H_{25})_2CH_3NO$$

and $$(C_{12}H_{25})_3NO$$

5. A process in accordance with claim 3 wherein the anionic surfactant is a compound selected from the group having the formula, $$C_{13}H_{27}(-OCH_2CH_2)_nSO_4^-M^+$$
$$C_{30}H_{61}SO_4^-M^+$$

and $$RR'SO_3^-M^+$$

where $n$ is a number in a range of from 0 to 15, M is a cation selected from the group consisting of hydrogen, sodium and potassium, R is an alkyl radical containing 2 to 12 carbon atoms and R' is a phenylene radical.

6. In a process of anodically oxidizing a liquid carbonaceous fuel at the anode of a fuel cell while in contact with an aqueous electrolyte, the improvement which comprises floating said fuel which is immiscible in said electrolyte, positioning said anode so as to extend through the resulting fuel-electrolyte interface and introducing about 0.001 wt. percent to 1.0 wt. percent of an organic surface-active agent comprising in combination a lipophilic component and a hydrophilic component into said electrolyte, said surface-active agent is lauryl dimethylamine oxide.

7. In a process of anodically oxidizing a liquid carbonaceous fuel at the anode of a fuel cell while in contact with an aqueous electrolyte, the improvement which comprises floating said fuel which is immiscible in said electrolyte upon said electrolyte, positioning said anode so as to extend through the resulting fuel-electrolyte interface and introducing about 0.001 wt. percent to 1.0 wt. percent of an organic surface-active agent comprising in combination a lipophilic component and a hydrophilic component into said electrolyte, said surface-active agent is ethylene oxide adduct of tridecyl alcohol sulfate.

8. In a process of anodically oxidizing an immiscible liquid carbonaceous fuel at the anode of a fuel cell while in contact with an aqueous electrolyte, said fuel being immiscible with said electrolyte, the improvement which comprises positioning said anode so as to extend through the resulting fuel-electrolyte interface and introducing about 0.001 wt. percent to 1.0 wt. percent of an organic surface-active agent comprising in combination a lipophilic component and a hydrophilic component into said electrolyte, said surface-active agent is a mixture of salts of perfluoro normal $C_8$ alkyl sulfonic acid.

References Cited

UNITED STATES PATENTS 2,384,463   7/1911   Gunn et al. _____ 136—86
2,925,454   2/1960   Justi et al. _____ 136—86

WINSTON A. DOUGLAS, *Primary Examiner.*

H. FEELEY, *Assistant Examiner.*